United States Patent [19]

Koishikawa et al.

[11] Patent Number: 5,239,430

[45] Date of Patent: Aug. 24, 1993

[54] DIGITAL INFORMATION SIGNAL REPRODUCING APPARATUS FOR REPRODUCING A DIGITAL AUDIO SIGNAL AT A REPRODUCING SPEED DIFFERENT FROM THE RECORDING SPEED

[75] Inventors: Yoshinori Koishikawa; Nobuhiro Chiba; Yoichiro Asato, all of Kanagawa, Japan

[73] Assignee: Sony Corporation, Tokyo, Japan

[21] Appl. No.: 588,034

[22] Filed: Sep. 25, 1990

[30] Foreign Application Priority Data

Sep. 29, 1989 [JP] Japan .................................. 1-256203
Nov. 21, 1989 [JP] Japan .................................. 1-302756

[51] Int. Cl.$^5$ ........................ G11B 5/588; G11B 5/09
[52] U.S. Cl. .................................... 360/77.13; 360/8; 360/10.2; 360/19.1; 360/47; 360/61; 358/312
[58] Field of Search .............................. 358/312, 313; 360/8-11.1, 191, 22, 23, 32, 38.1, 27, 77.13, 77.16, 78.02, 47, 61

[56] References Cited

U.S. PATENT DOCUMENTS

| | | | |
|---|---|---|---|
| 4,933,784 | 6/1990 | Oldershaw et al. | 360/77.16 |
| 5,043,830 | 8/1991 | Nobuhiro | 360/19.1 |
| 5,081,550 | 1/1992 | Yagisawa et al. | 360/78.02 |

Primary Examiner—Jerry Smith
Assistant Examiner—Steven R. Garland
Attorney, Agent, or Firm—Alvin Sinderbrand; William S. Frommer

[57] ABSTRACT

In a digital information signal reproducing apparatus in which a first digital audio signal and a second digital audio signal having the same contents are recorded on two oblique tracks which are close to each other on a record tape while the latter is run at a normal speed, and in which the first and second digital audio signals are reproduced from the tape by plural rotary heads; a head position controller is operative to control a scanning position of each of the rotary heads so that the latter scan the tracks during variable speed reproduction when the tape is run at a speed different from the normal speed, and to cause the heads to periodically jump over a plurality of the tracks; a detector detects when the rotary heads controlled by the head position controller jump over the plurality of tracks; and a processor responsive to the detector for switching the first digital audio signal and the second digital audio signal, as in a cross-fading operation, for a predetermined period when a jump is detected and selecting one of the first digital audio signal and the second digital audio signal depending on an error state in a period other than such predetermined period, thereby ensuring that error correction capability is not lowered at the time of variable speed reproduction.

6 Claims, 11 Drawing Sheets

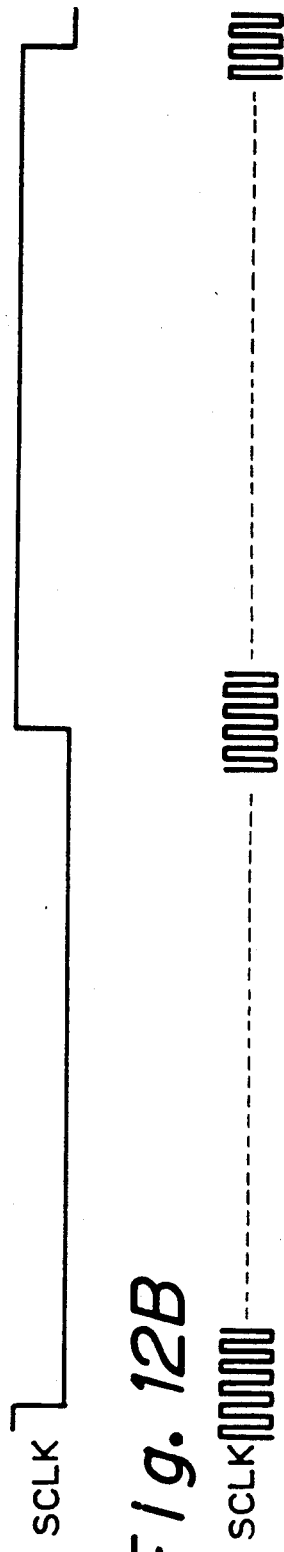
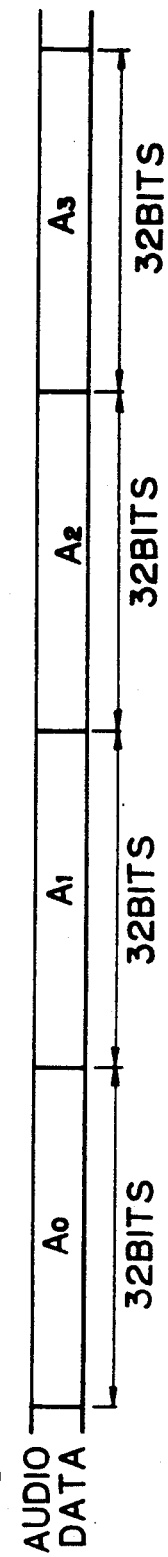
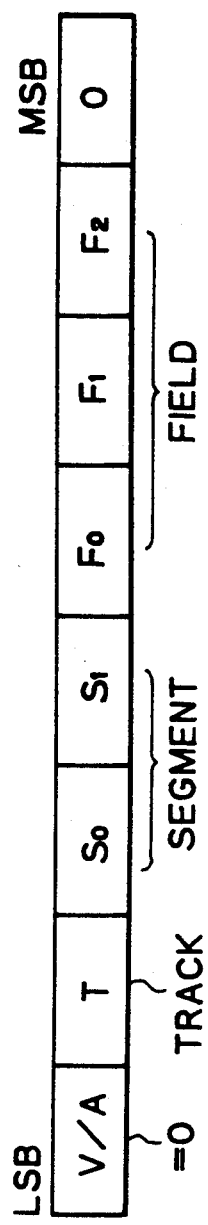

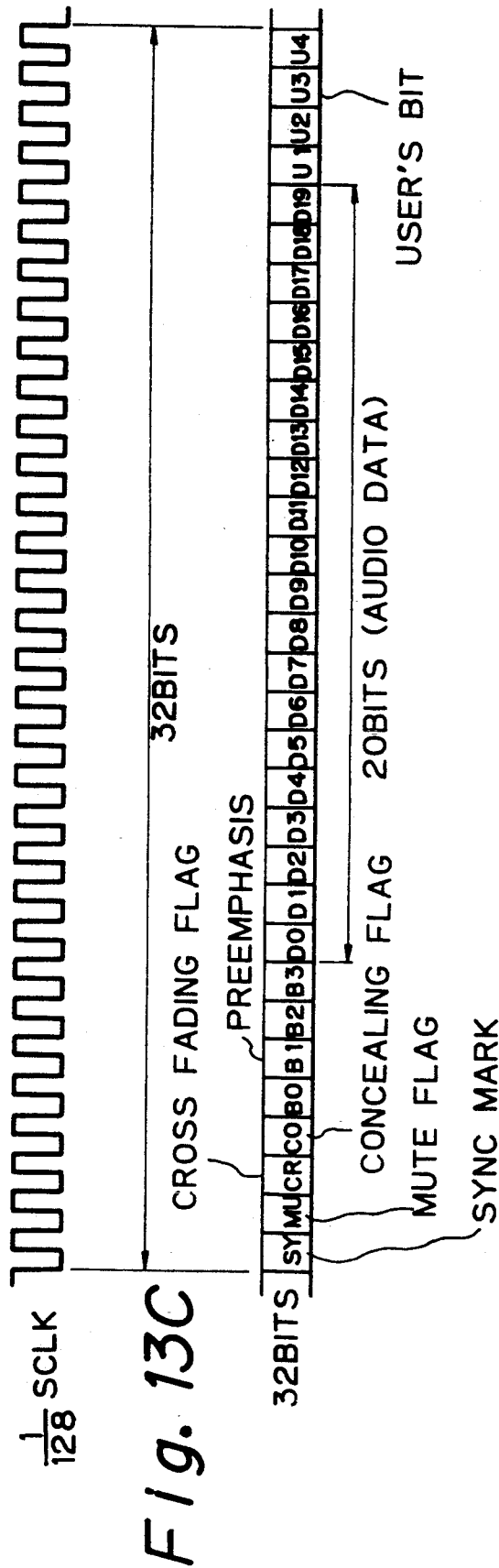
Fig. 13A
Fig. 13B
Fig. 13C

DIGITAL INFORMATION SIGNAL REPRODUCING APPARATUS FOR REPRODUCING A DIGITAL AUDIO SIGNAL AT A REPRODUCING SPEED DIFFERENT FROM THE RECORDING SPEED

BACKGROUND OF THE INVENTION

1. Field of the Invention

The present invention relates to a digital information signal reproducing apparatus applicable to audio signal processing in a digital VTR which records/reproduces digital video signals and digital audio signals.

2. Description of the Prior Art

For a digital video tape recorder VTR which records/reproduces a composite digital color video signal and a digital audio signal, there is a digital VTR standard based on D-2 format authorized by the SMPTE (Society of Motion Picture and Television Engineers). According to this standard, first and second identical copies of an input digital audio signal are recorded at head-leaving end portions of a first track or tracks and at head-entering end portions of a second track or tracks adjacent the first track or tracks. The two digital audio copies are separately decoded and output, and the decoding scheme utilizes both the first copy and the second copy. Specifically, since two copies of identical data are recorded as a first copy and a second copy, data having no errors are selected from the first copy and the second copy to construct a code block of outer codes by referring to an error flag provided by inner code decoding. With respect to this outer code block, the correction of the outer codes results in the improvement of error correction processing.

Using this digital VTR standard, variable speed reproduction in which the tape speed is different from that at the time of normal mode is possible. At the time of variable speed reproduction, a scanning trace of a rotary head does not coincide with an inclined recording track. However, in the above case where the tape speed is several times for the normal reproducing mode, the rotary head is displaced transversely relative to the recording track by piezoelectric elements so that the scanning trace of the rotary head coincides with the track. Such a tracking technique is called "dynamic tracking".

At the time of variable speed reproduction, for example, at the time of double speed reproduction, such dynamic tracking is used so that the rotary head scans a group of tracks on which one field signal is recorded. Then, the head jumps over tracks on which the next field signal is recorded and scans the tracks on which a following field signal is recorded. As a result of this track jump, the contents of the audio data of the first copy reproduced just prior to the track jump do not coincide with the contents of the audio data of the second copy reproduced immediately after the jump. Consequently, erroneous error correction processing results if the decoding using the first copy and the second copy is based on an error state similar to the one in normal reproduction.

To avoid the erroneous correction processing, only the audio data of either the first copy or the second copy are used as a reproduced output at the time of variable speed reproduction. As a result, a problem exists in that error correction capability is lowered as compared with that in normal reproduction.

OBJECTS AND SUMMARY OF THE INVENTION

An object of the present invention, therefore, is to provide a digital information signal reproducing apparatus capable of preventing the degradation of error correction capability at the time of variable speed reproduction.

Another object of the present invention is to provide a digital information signal reproducing apparatus capable of correctly detecting whether the rotary magnetic head jumps the tracks and of processing the first and second reproduced digital audio signals in accordance with the detection result, so that noise occurring in the switching period between the first and second digital audio signals is decreased.

In order to accomplish the above objects, according to the invention, there is provided, in a digital information signal reproducing apparatus in which identical first and second digital audio signals are recorded on the head-leaving end portion and the head-entering end portion of two oblique tracks, respectively, which are located close to each other on a recording medium while the latter is run at a normal speed and in which the first digital audio signal and the second digital audio signal are reproduced from the recording medium by means of a rotary head, the combination comprising:

head position control means for controlling a scanning position of the rotary head so that it coincides with the tracks at the time of variable speed reproduction when the recording tape medium is run at a speed different from the normal speed;

detecting means for detecting that the rotary head controlled by the head position control means jumps over a plurality of the tracks; and processing means responsive to the detecting means for cross-fading or otherwise switching the first digital audio signal and the second digital audio signal for a predetermined period at the time of the jump.

The above, and other, objects, features and advantages of the present invention will become readily apparent from the following detailed description thereof which is to be read in connection with the accompanying drawings.

BRIEF DESCRIPTION OF THE DRAWINGS

FIGS. 12A, 12B and 12C are diagrams showing 4-channel audio data;

FIGS. 13A, 13B and 13C are diagrams showing 1-channel audio data; and

FIG. 14 is a diagram showing a sector ID.

DETAILED DESCRIPTION OF THE PREFERRED EMBODIMENTS

A preferred embodiment of the present invention which is applicable to the reproduction of audion data of a digital VTR will now be explained with reference to the accompanying drawings.

The explanation is made in the following order:
A. Recording circuit and reproducing circuit of a digital VTR
B. Scanner and track format
C. Variable speed reproduction operation
D. Data processing at the time of variable speed reproduction
E. Another embodiment

A. RECORDING CIRCUIT AND REPRODUCING CIRCUIT OF A DIGITAL VTR

Figure 1:
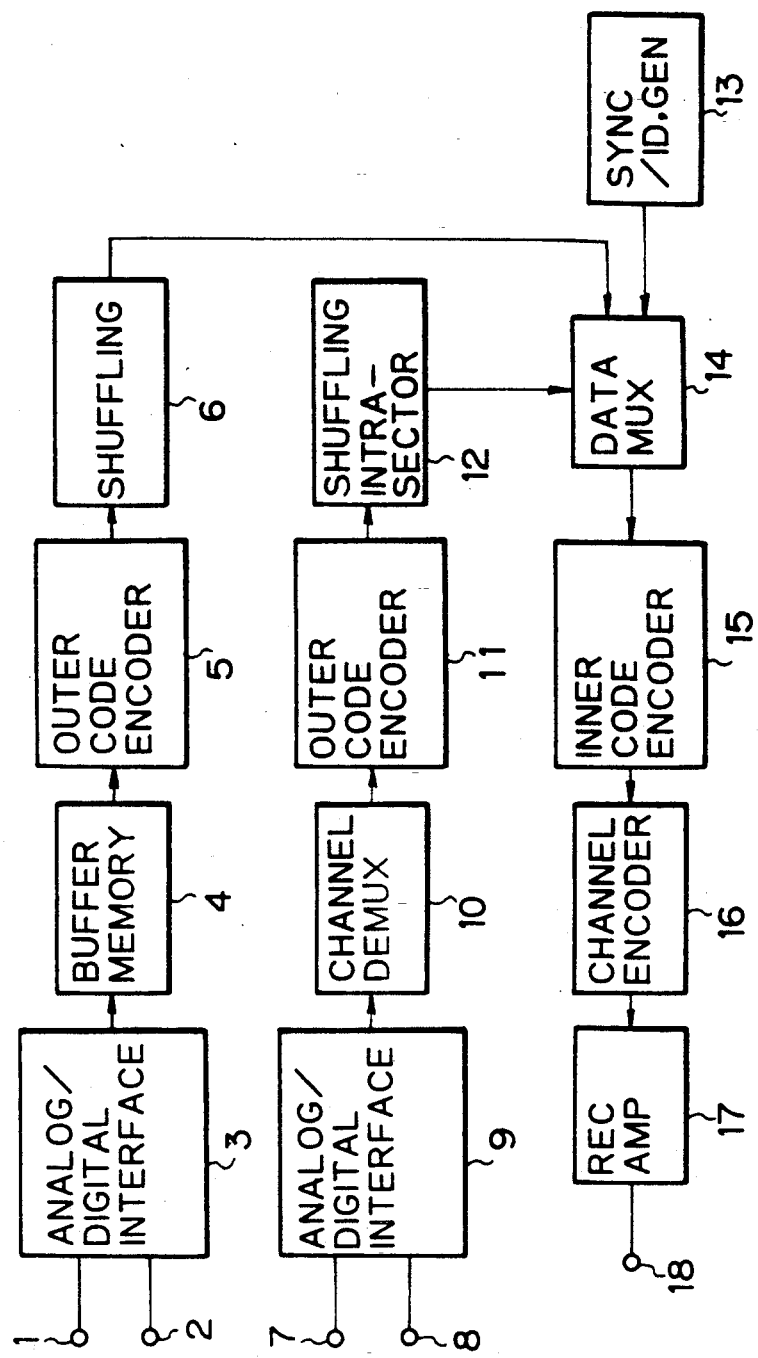
FIG. 1 is a block diagram showing the recording system of a digital VTR to which the present invention can be applied.

The recording circuit of a digital VTR to which this invention can be applied is shown in FIG. 1 to have an input terminal for an analog audio signal, an input terminal 2 for a digital audio signal, and an analog/digital interface 3. A buffer memory 4 is connected to the interface 3. The time base of the audio data is compressed by the buffer memory 4, and the data are converted into the arrangement of a block structure. The encoding of outer codes, or error correction codes, is effected by an outer code encoder 5. A shuffling circuit 6 is comprised of a memory device for performing the rearrangement of audio data.

The recording circuit is also shown to have an input terminal 7 for an analog video signal, an input terminal 8 for a digital video signal, and an analog/digital interface 9. The output signal of the interface 9 is supplied to a channel demultiplexer 10 and converted into 2-channel data sequences. Each 2-channel data sequence is supplied to an outer code encoder 11 and subjected an outercode encoding process. The output data of the encoder 11 is supplied to a shuffling circuit 12 for rearranging the order of video data in a sector.

The audio data from the shuffling circuit 6, the video data from the intrasector shuffling circuit 12, and a synchronization signal and an ID signal from a synchronization and ID generating circuit 13 are fed to a data multiplexer 14. The output signal of the data multiplexer 14 is fed to an inner code encoder 15 in which an inner code encoding process is performed. The output signal of the inner code encoder 15 is then supplied to a channel encoder 16 where it is subjected to an encoding process employing an $M^2$ code. The output signal of the channel encoder 16 is output through a recording amplifier 17 at an output terminal 18.

Figure 2:
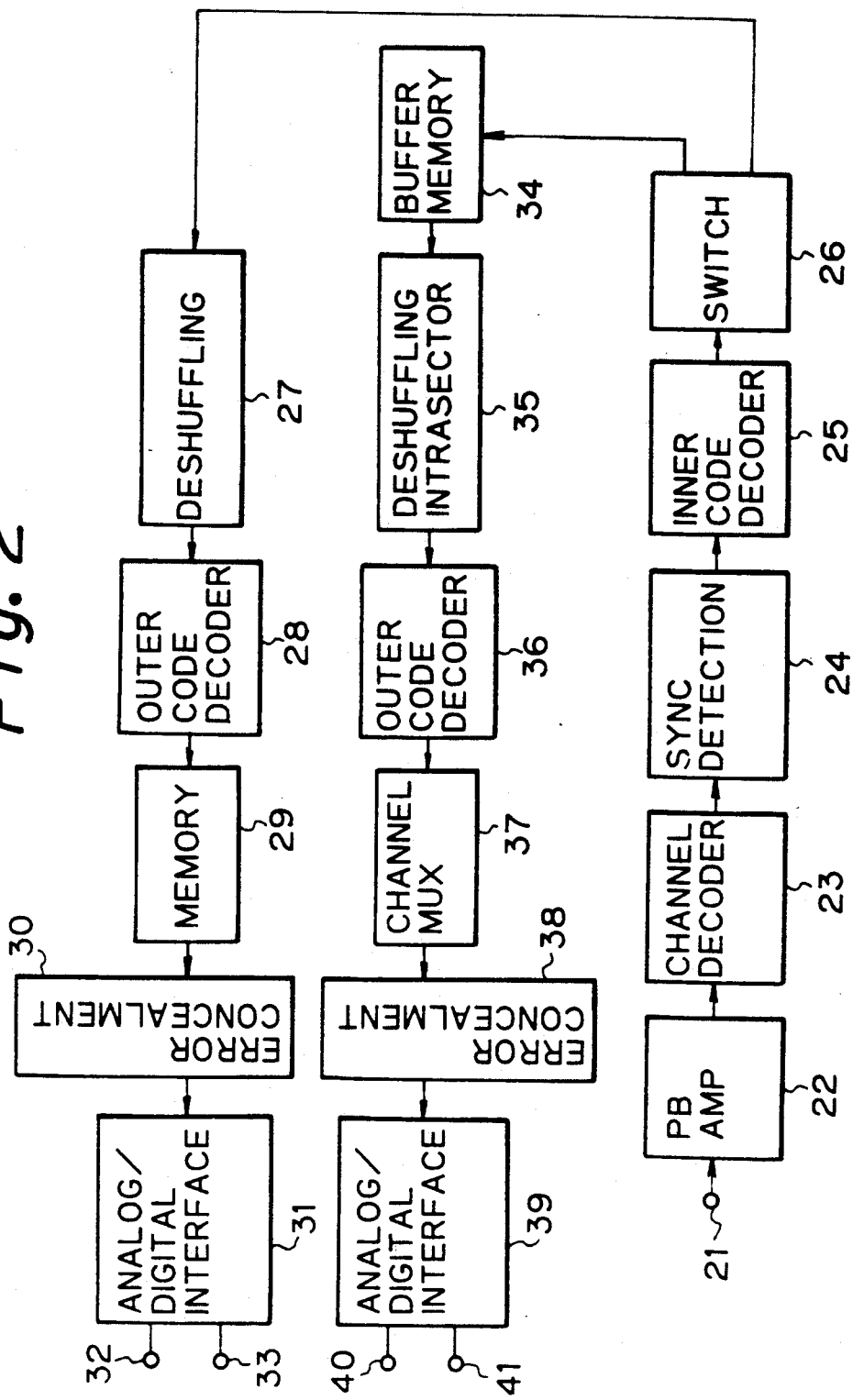
FIG. 2 is a block diagram showing the reproducing system of a digital VTR to which the present invention can be applied.

A rotary head is connected to the output terminal 18 and recording data are recorded onto a magnetic tape by the rotary head. In FIG. 2, reproduced data from the magnetic tape are supplied through an input terminal 21 to a reproduction or playback amplifier 22. The output signal of the reproduction amplifier 22 is fed to a channel decoder 23 where it is subjected to $M^2$ code decoding.

The output signal of the channel decoder 23 is fed to a synchronization detector 24 for the detection of a synchronization signal. The output signal of the synchronization detector 24 is supplied to an inner code decoder 25 wherein inner code decoding is performed. The output signal of the inner code decoder 25 is supplied to a switch circuit 26 in which audio data a video data are separated.

The audio data are fed to an outer code decoder 28 after they are deshuffled by a deshuffling circuit 27. Outer code decoding is performed at the outer code decoder 28 and the output data are written into a memory 29. The outer code decoding effects, for example, erasure correction by reference to an error flag generated in the inner code decoding. The time base expansion of data is performed by the memory 29. Then, audio data read out of the memory 29 is supplied to an error concealment circuit 30 for error data concealment. The output data of the error concealment circuit 30 is fed to an analog digital interface 31. An analog audio signal is produced at an output terminal 32, and a digital audio signal is obtained at an output terminal 33.

Video data separated at the switch circuit 26 are written into a buffer memory 34. The video data read out of the buffer memory 34 are supplied to an outer code decoder 36 through an intrasector deshuffling circuit 35. After the data are subjected to error correction in the outer code decoder 36, they are supplied to a channel multiplexer 37 which converts a 2-channel data sequence into a 1-channel data sequence. The output signal of the channel multiplexer 37 is fed to an error concealment circuit 38 for the concealment of error data. Then, the output signal of the error concealment circuit 38 is supplied to an analog/digital interface 39. An analog video signal is produced at an output terminal 40, and a digital video signal is obtained at an output terminal 41.

B. SCANNER AND TRACK FORMAT

Figure 3:
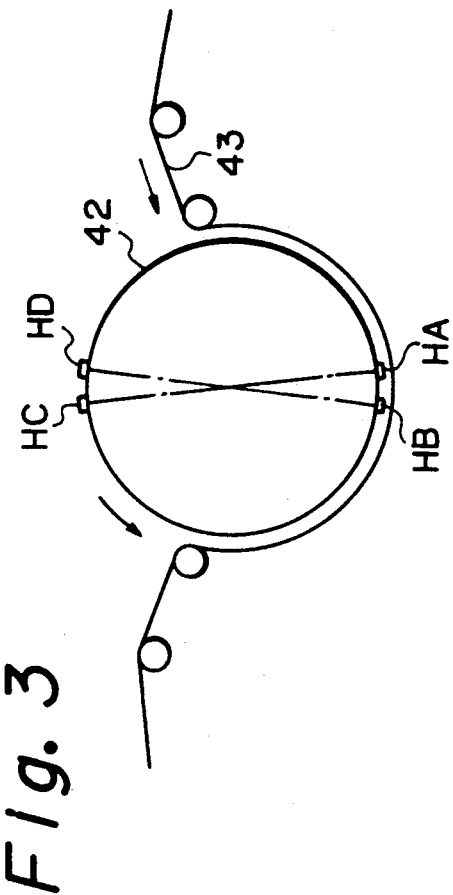
FIG. 3 is a plan view showing a scanner.

FIG. 3 shows an example of a scanner of a digital VTR. Four head chips HA, HB, HC and HD, are attached to a drum 42 which rotates, for example, in a counter-clockwise direction as indicated by the arrow. The head chips HA and HB are shown to be close to each other, and the head chips HC and HD are shown to be close to each other, whereas the head chips HA and HC are arranged at an angular interval of 180° with respect to each other and the head chips HB and HD are arranged at an angular interval of 180° with respect to each other. A magnetic tape 43 is obliquely wound on a peripheral surface of the drum 42 with a wrap angle slightly larger than 180°. The pair of head chips HA and HB and the pair of head chips HC and HD alternately have sliding contact with the magnetic tape 43. Of course, the periods of sliding contact of the heads HA are HB and of the heads HC and HD have some overlap due to the wrap angle of the tape on the drum 42 being larger than 180°. The gap angles of the head chips HA and HB are different from each other, and the gap angles of the head chips HC and HD are similarly different from each other to perform azimuth recording. Hence, one reproduction signal is produced by multiplexing the reproduction signals of the head chips HA and HC which have the same azimuth angle, and another reproduction signal is similarly produced by multiplexing the reproduction signals of the head chips HB and HD.

The head chips HA and HB are provided at one end of a supporting plate (not shown) comprised of two plate-like piezoelectric elements, and the head chips HC and HD are provided at one end of a similar supporting plate. Each supporting plate is operative to displace the respective head chips in the transverse direction across the track being scanned by an amount proportional to a driving voltage applied to the piezoelectric elements. For example, when signal reproduction is effected with the tape speed set in the range of ($-1$ to $+3$) [the sign represents the direction in which the magnetic tape 43 moves, and $+1$ indicates the tape speed at the time of normal reproduction], the driving voltage for the piezoelectric elements is generated in accordance with the tape speed by a microcomputer or the like. As a result, the four head chips HA, HB, HC and HD correctly scan the tracks formed on the magnetic tape 43.

In the case of a video signal with a field frequency of 60 Hz in the NTSC system, one field is divided into three segments, and each segment is recorded in two tracks. Accordingly, the video signal of one field is recorded on the magnetic tape 43 as three segments in six tracks.

Figure 4A:
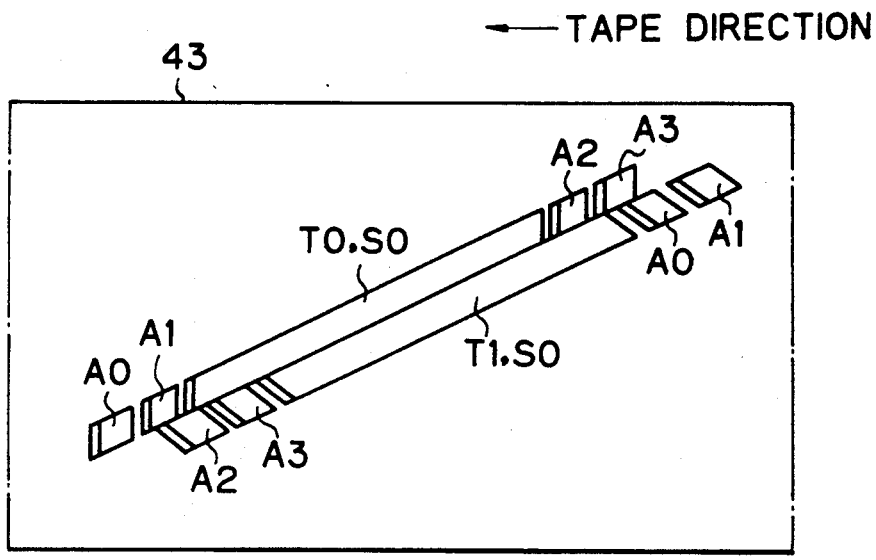
FIGS. 4A and 4B are diagrams showing a format on a tape of the digital VTR.
Figure 4B:
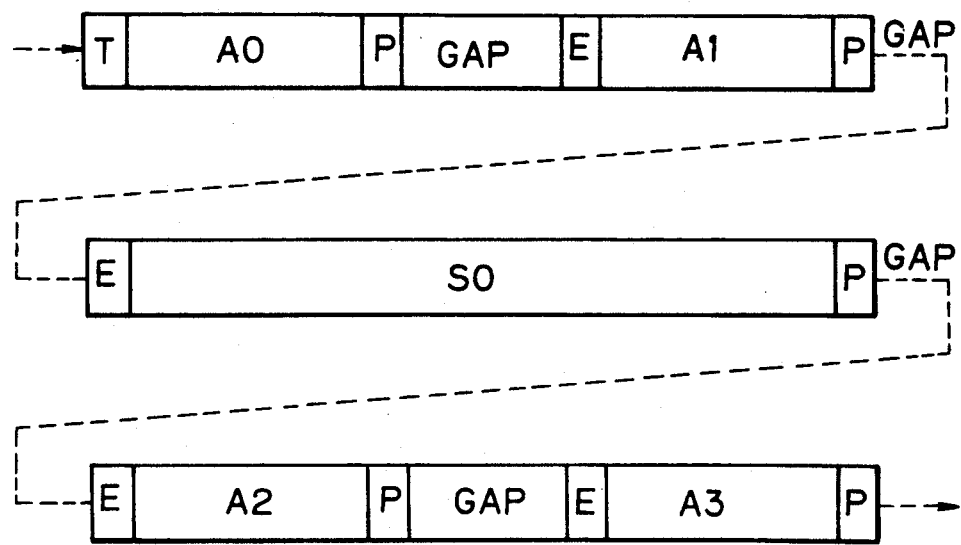

FIG. 4A and FIG. 4B show a track format formed on the magnetic tape 43. FIG. 4A shows a track pattern as viewed from the side of the tape having the magnetic surface, while FIG. 4B shows the format in one track in the order of head scanning. A0, A1, A2 and A3 indicate respective audio sectors, and these audio sectors A0 to A3 are arranged on the end portions of the tracks. The sectors A0 to A3 respectively contain first, second, third and fourth channel data. Also, the same contents of the audio data are recorded twice at opposite end portions of the tracks. More specifically, the audio data of the same contents are recorded, on a previous pair of tracks containing a video segment, at the track end portions adjacent the head-leaving side of the tape and, on the present pair of tracks containing a video segment, at the track end portions adjacent the head entering side of the tape. The audio data first recorded at the track end portions adjacent the head-leaving side is called "the first copy", while the same audio data again recorded at the track end portions adjacent the head-entering side are called "the second copy". A video sector lies in the central portion of each of the tracks of a pair indicated at T0 and T1 on FIG. 4A and together constitute a video segment S0.

As shown in FIG. 4B, gaps GAP for editing are provided between audio sectors and between the audio sector and the video sector. The audio sectors A0, A1, A2 and A3 are each comprised of six sync blocks and the video sector is comprised of 204 sync blocks. In FIG. 4B, T indicates a track preamble, E indicates an editing gap preamble, and P indicates a postamble.

Figure 5:
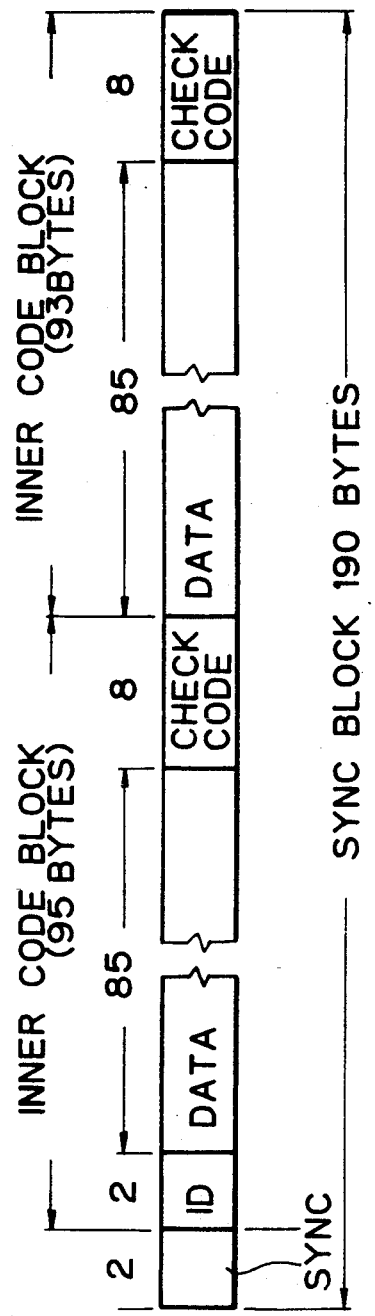
FIG. 5 is a diagram showing a sync block format.

As shown in FIG. 5, each sync block has a length of 190 bytes, and a synchronization pattern of two bytes is added to the head of each block. A two-byte ID pattern which is an identification signal (ID signal) is then added, and inner code encoding is performed for the ID pattern and the 85-byte data so that an eight-byte check code is formed. Additionally, an eight-byte check code is added to the other 85-byte data in order to construct an inner code block.

Figure 6:
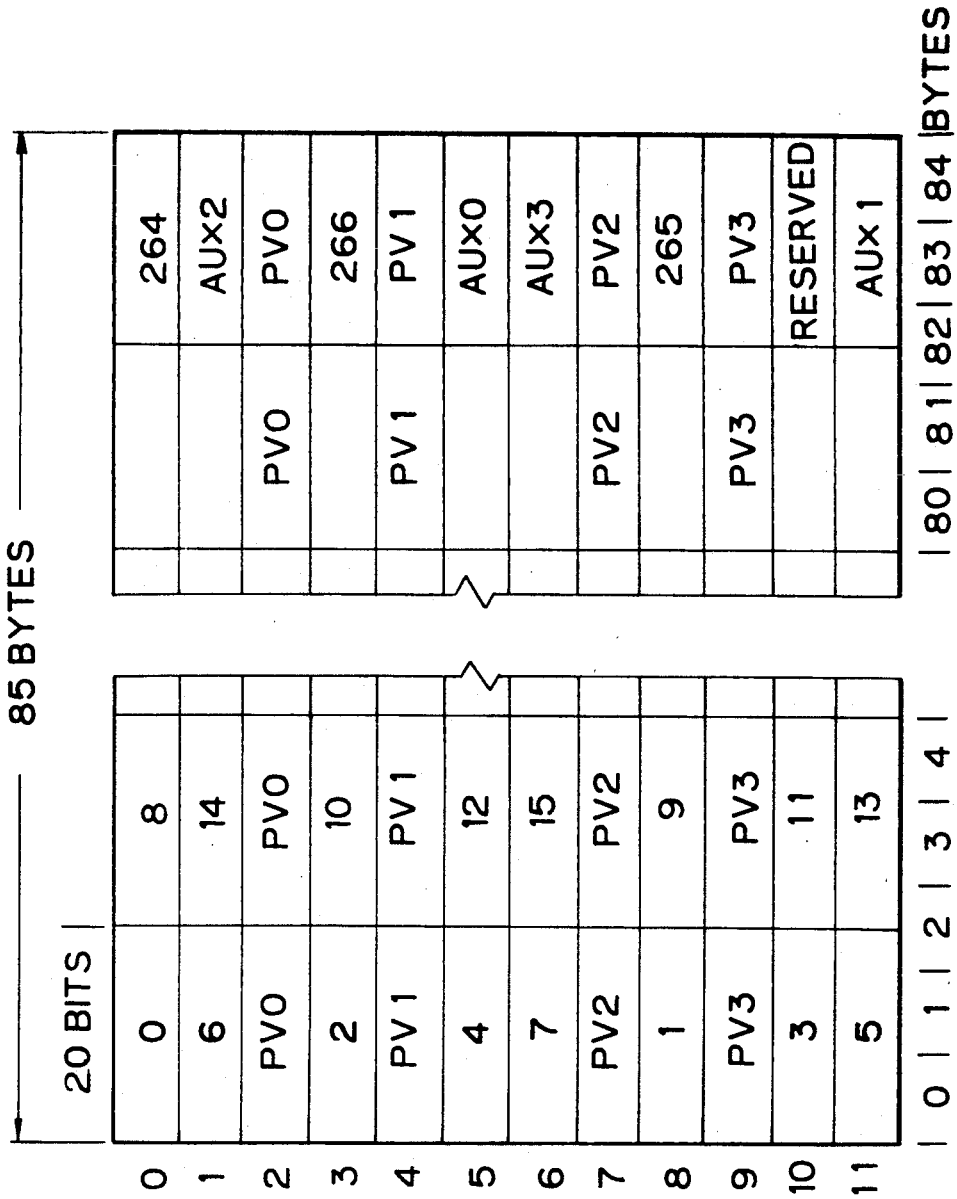
FIG. 6 is a diagram showing a block arrangement of audio data.

The inner code block is common to the audio data and the video data. Reed Solomon codes are used for both the inner code and the outer code. There are 266 or 267 samples of audio data recorded on each audio sector. FIG. 6 is an example of a block structure contained in one audio sector.

In FIG. 6, numerals 0 to 266 indicate samples of audio data, PV0 to PV3 indicate check codes for outer codes, and AUX0 to AUX3 indicate auxiliary words. The audio data, check codes and auxiliary words have been shuffled. In FIG. 6, an illustration of check codes for inner codes is omitted. Although the bit length of one sample of the audio data is 20 bits, the inner code encoding is performed by representing one byte as one symbol. A plurality of bytes which are arranged in the longitudinal direction of the arrangement shown in FIG. 6 construct a block. As a result, one sector is made up of 85 outer code blocks.

C. VARIABLE SPEED REPRODUCTION OPERATION

Figure 7A:
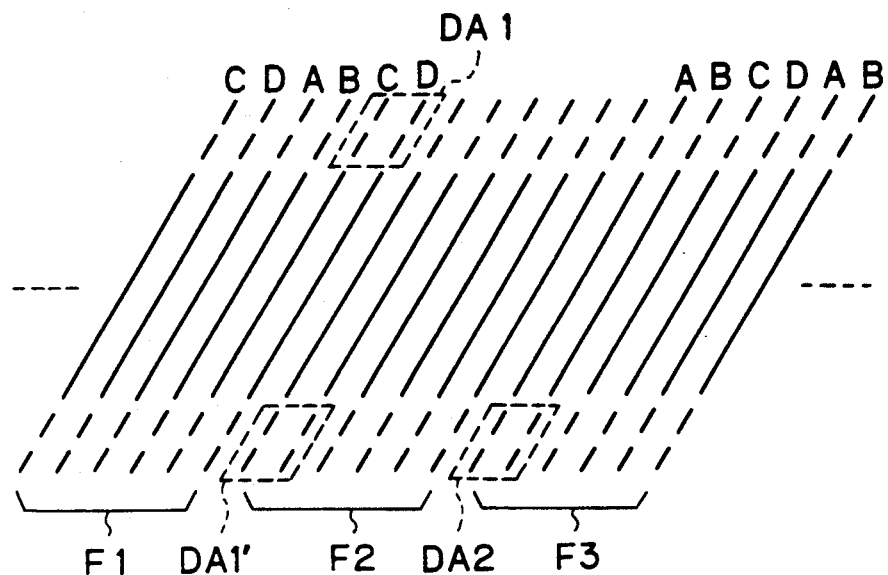
FIGS. 7A, 7B and 7C are diagrams to which reference will be made in describing reproduction operation.
Figure 7B:
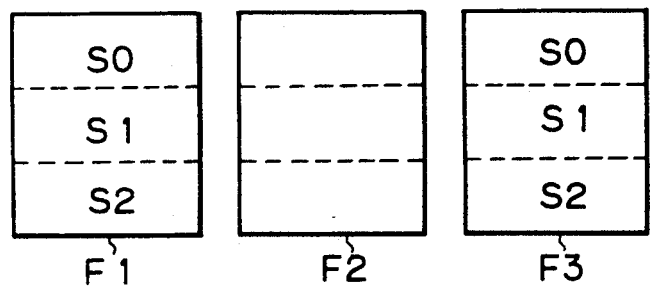
Figure 7C:
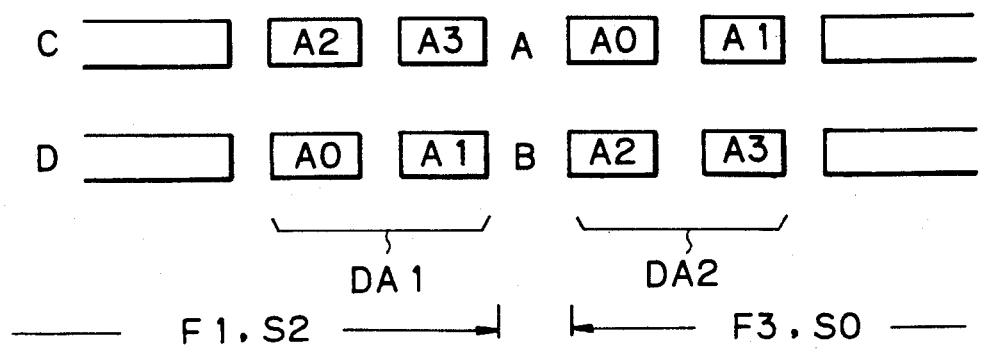

The variable speed reproduction operation will now be explained with reference to FIG. 7. The above-described track format is shown in FIG. 7A for three successive fields $F_1$, $F_2$ and $F_3$. Reference symbols A to D in FIG. 7A represent tracks scanned by the head chips HA to HD, respectively. At the time of variable speed reproduction, for example, at the time of double speed or $+2$ reproduction, three segments (six tracks) on which the field F1 is recorded are reproduced with dynamic tracking control so as to be reproduced by the head chips HA to HD in a manner similar to that of normal reproduction. Upon the completion of the reproduction of field F1, the next six tracks on which signals of field F2 are recorded are jumped over so that the tracks on which video signals of the following field F3 are recorded are next reproduced. As a result, as shown in FIG. 7B, during double-speed playback, reproduced video data of the field F3 are obtained after the field F1. In FIG. 7B, S0, S1 and S2 indicate first, second and third segments of each field.

As shown in FIG. 7A, a first copy DA1 of audio data is recorded on the head-leaving side end portions of the last two tracks of the track set containing the video data of the field F1, and a second copy DA1' of the same audio data is recorded on the head-entering side end portions of the first two tracks of the track set containing the video data of the next field F2. The first copy DA1 and the second copy DA1' are of identical audio data and, in the normal reproducing mode are reproduced one after the other at the end of the field F1 and the beginning of the field F2 by the different heads CD and AB, respectively so as to provide advantageous audio signal redundancy. However, since the signals of field F2 are not reproduced during double-speed playback, the second copy of DA2 which is reproduced for providing a pair with the first copy DA1 is that recorded on the head entering end portions of the first two tracks containing the field F3. Needless to say, the second copy DA2 contains different audio data from the first copy DA1.

As a result, in this embodiment, where the reproduced first copy and second copy are of different audio data, a cross fading operation is performed, whereas, so long as the reproduced first copy and second copy are of identical audio data, the decoding process is similar to that in the normal reproduction mode, that is, cross-fading is not employed.

D. DATE PROCESSING AT THE TIME OF VARIABLE SPEED REPRODUCTION

Figure 8:
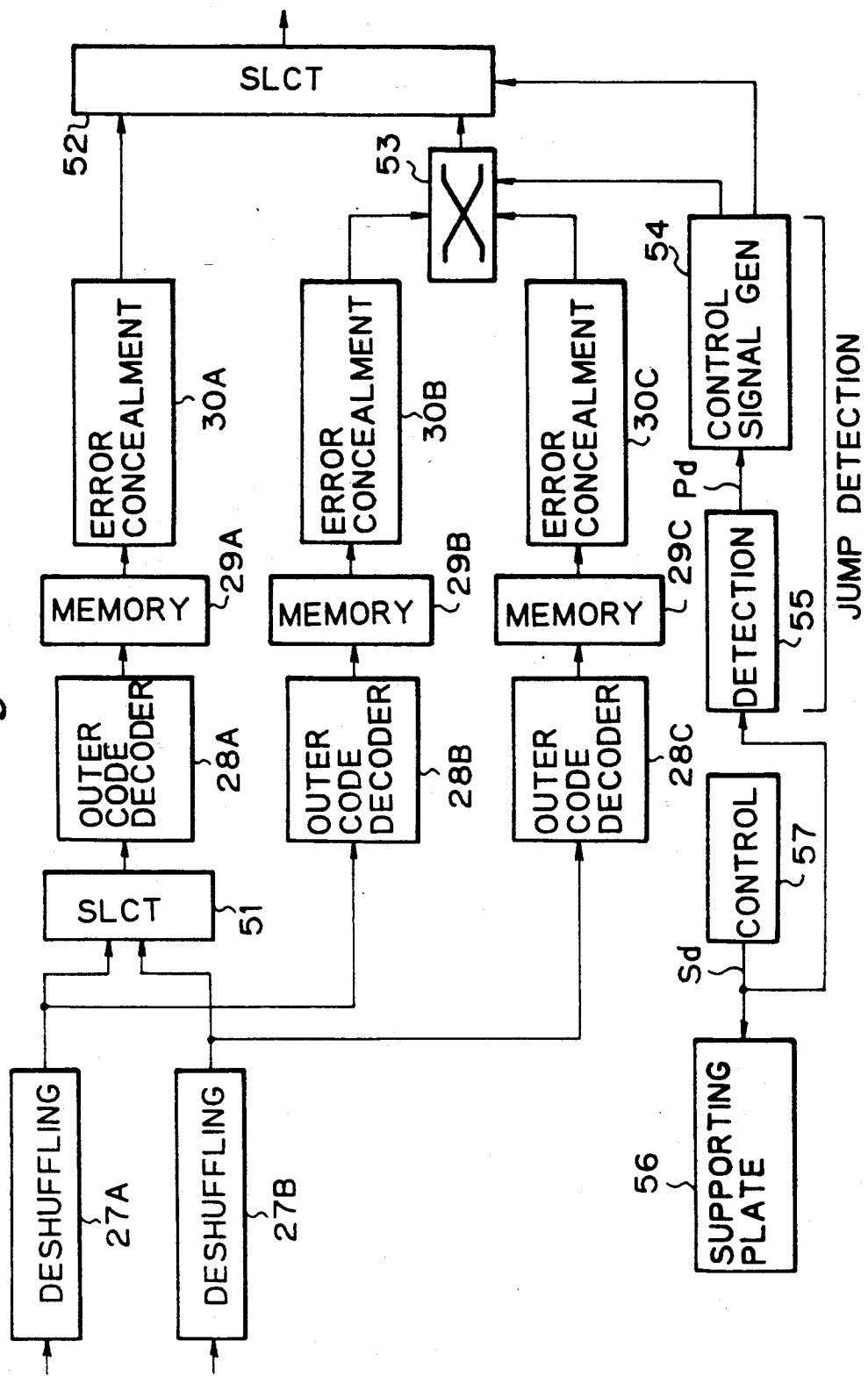
FIG. 8 is a block diagram showing a main part of one embodiment of the present invention.

FIG. 8 shows a processing circuit for audio data which is applicable at the time of variable speed reproduction. Reference numerals 27A and 27B identify two deshuffling circuits, respectively. Reproduced data obtained from the reproduction outputs of the head chips HA and HC which alternately abut the tape are supplied to one deshuffling circuit 27A, while reproduced data obtained from the reproduction outputs of the head chips HB and HD which alternately abut the tape are supplied to the other deshuffling circuit 27B. The output signals of the deshuffling circuits 27A and 27B are fed through a selector 51 to an outer code encoder 28A. In addition, the output signals of the deshuffling circuits 27A and 27B are supplied to outer code decoders 28B and 28C.

In order to produce a code block of outer codes, the selector 51 selects data having no error from the first copy and the second copy by referring to an error flag generated in an inner code decoder. The outer code decoder 28A decodes the output data of the selector 51. The decoded output of the former is given to an error concealment circuit 30A through a memory 29A. The output signal of the error concealment circuit 30A is supplied to a selector 52.

Then, data which are decoded at the decoders 28B and 28C, respectively, are fed to a cross fader 53 through memories 29B and 29C, and error concealment circuits 30B and 30C. Next, the output signal of the cross fader 53 is supplied to the selector 52. The signal selected by the selector 52 is fed into the analog/digital interface 31 (refer to FIG. 2). Control signals are supplied from a control signal generator 54 to the selector 52 and the cross fader 53. A detection pulse Pd is fed to the control signal generator 54 from a detection circuit 55.

Figure 10:
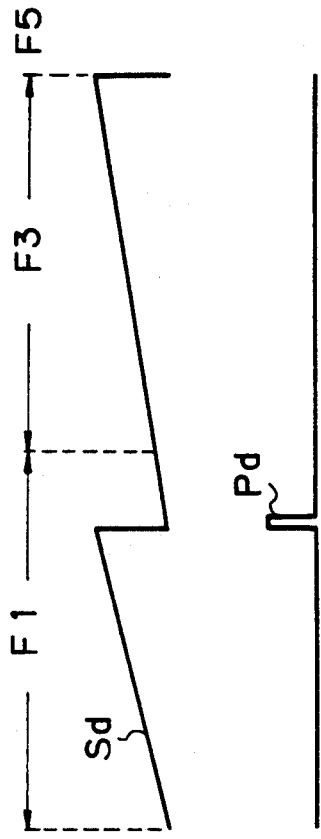
FIGS. 10 and 11 are diagrams to which reference will be made in describing a variable speed reproduction operation according to the invention.

A driving signal Sd for dynamic tracking is fed from a control circuit 57 to a head supporting plate 56. The detection circuit 55 detects a track jump from the driving signal Sd. FIG. 10 shows a detection operation for the track jump. A sawtooth-like driving signal Sd is fed to the supporting plate of the head chips HA and HC at the time of double speed reproduction shown in FIG. 7A. Thus, the field F1 is reproduced, and after a track jump occurs, the field F3 is reproduced. Since the level of the driving signal Sd drastically changes at the time of the track jump, the detection pulse Pd is formed on the basis of the change in the driving signal. The detection pulse Pd is only generated when the change of the driving signal Sd is equal to or greater than a predetermined level in order to accurately detect the track jump. The start time of the cross fader 53 is determined by the detection pulse Pd, and the control signal sent to the selector 52 is also produced from the pulse Pd.

Figure 11:
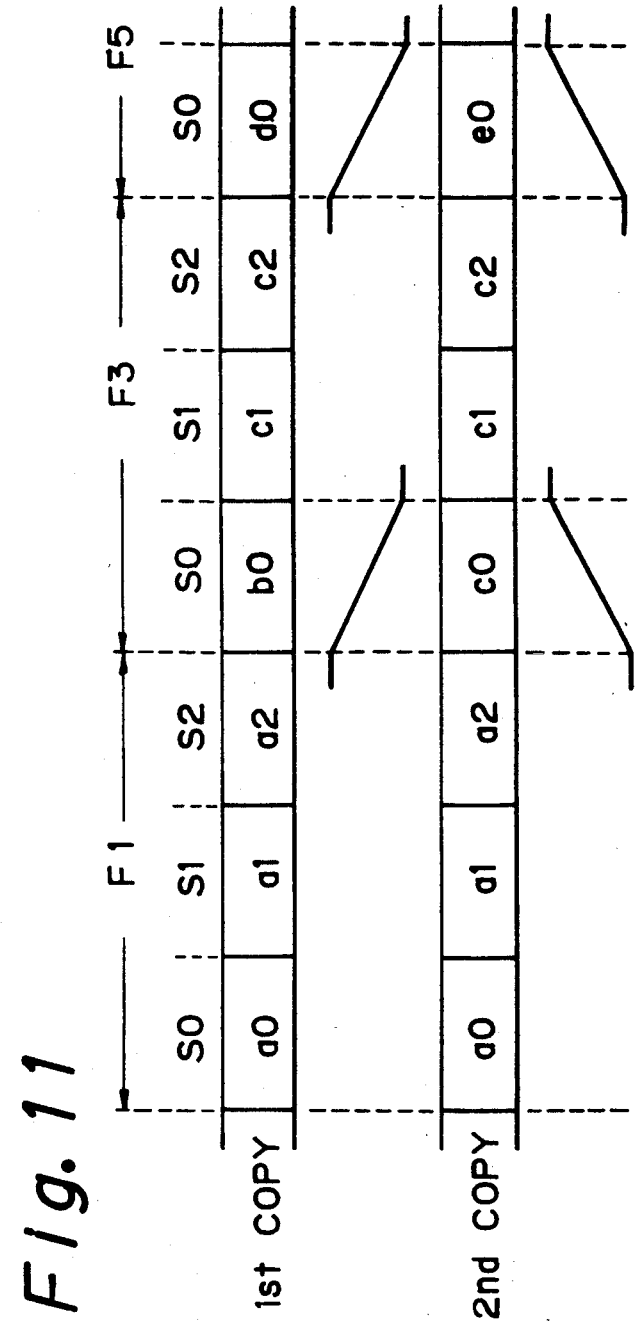

FIG. 11 diagrammatically indicates the first copy and the second copy of reproduced audio data provided from the error concealment circuits 30B and 30C. For the sake of simplicity, FIG. 11 shows only the audio signal A0 (decoded output of the audio selector 52) of a first channel, with a0, a1 and a2 representing reproduced audio data associated with the segments S0, S1 and S2 of the field F1; b0 representing reproduced audio data associated with the segment S0 of the field F2; c0, c1 and c2 representing reproduced audio data associated with the segments S0, S1 and S2 of the field F3; d0 representing reproduced audio data associate with the segment S0 of the field F4; and e0 representing reproduced audio data associated with the segment S0 of the field F5. Of course, each of the first copies of the audio data a0, b0 and d0 associated with a first segment S0 of the fields F1, F2 and F4, respectively, actually is reproduced during the scanning of the head-leaving end portions of the last two tracks in which the next preceding field is recorded.

During the double speed reproduction, the segments S0, S1 and S2 of the field F1 are reproduced with dynamic tracking, and, at the completion thereof, a jump is effected over the tracks in which the field F2 is recorded, and the segments S0, S1 and S2 of field F3 are next reproduced with dynamic tracking. The audio data b0 associated with segment S0 of the field F2 is reproduced as the first copy prior to the track jump from the head-leaving end portions of the last two tracks containing the field F1. However, because of the track jump, the second copy is the audio data c0 associated with the segment S0 of the field F3. Similarly, when the track jump is made from the field F3 to a field F5, the audio data of the first copy reproduced just before the track jump is the data d0 of the field F4, and the audio data of the second copy is the data e0 of the field F5.

The cross fader 53 operates during each period when the audio data of the first copy and the second copy are different, and, in such case, each sample of the audio date of the first copy is multiplied by coefficients which are gradually decreased, while each sample of the audio data of the second copy is multiplied by coefficients which are gradually increased.

The selector 52 selects the output of the error concealment circuit 30A during a time interval in which the audio data of the first and second copies are the same, and selects the output of the cross fader 53 during a time interval in which the audio data are different, that is, during the operation of the cross fader 53.

The switching which occurs at the time of a track jump can be employed for muting a discontinuous portion when outputting either the first or the second copy, for concealing the discontinuous portion rather than for effecting the cross fade. However, the fading process is advantageous because sound is smoothly coupled at the field switching point.

E. ANOTHER EMBODIMENT

Figure 9:
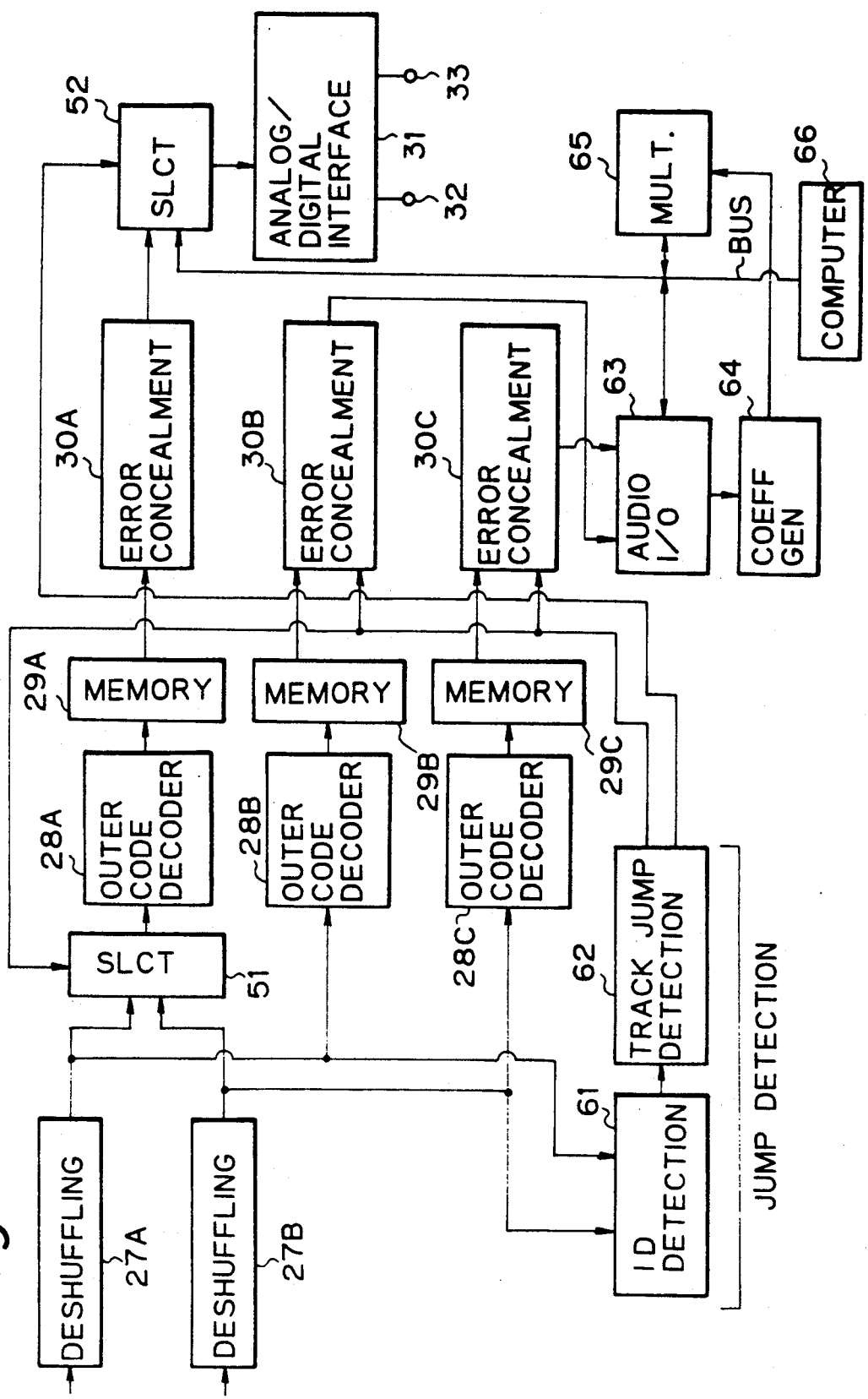
FIG. 9 is a block diagram showing a main part of another embodiment of the present invention.

Another embodiment of this invention will now be described with reference, to FIG 9. In the embodiment of FIG. 8, detection of a track jump is based on the driving signal Sd which is fed to a head chip supporting plate. In the embodiment which is to be described below, the detection of a track jump is based on an ID signal in a sync block. In FIG. 9, like reference numerals are used to identify the corresponding portions of FIG. 8.

In FIG. 9, an ID detector 61 detects an ID signal from the audio signals of deshuffling circuits 27A and 27B and then supplies the ID signal to a track jump detector 62. The track jump detector 62 detects whether the ID signals of the first and second copies received from the ID detector 61 coincide with each other and whether the ID signal of the audio signal of the first copy has continuity with respect to the ID signal of the audio signal copy reproduced prior to the digital audio signal of the first copy. The detector 62 supplies flag control signals to error concealment circuits 30B and 30C depending on the detection state and sends selection signals to selectors 51 and 52 when it detects a track jump.

An audio I/O circuit 63 supplies audio signals of the first and second copies from the error concealment circuits 30B and 30C to a bus BUS which includes a data bus, and address bus and a control bus (not shown). The I/0 circuit 63 supplies flag signals of the audio signals of the first and second copies to a coefficient signal generator 64. The coefficient signal generator 64 generates a coefficient signal in dependence on a flag signal from the audio I/0 circuit 63 and supplies the coefficient signal thus generated to a multiplier 65. The multiplier 65 multiplies the audio signal of the first or second copy from the audio I/0 circuit 63 by the coefficient signal there supplied from the coefficient signal generator 64. The multiplied first or second digital audio signal is then supplied through the selector 52 to an analog/digital interface 31.

A format of the digital audio signal will now be described with reference to FIGS. 12 and 13. FIG. 12A shows a sampling clock SCLK of 48 kHz, FIG. 12B shows a bit clock 1/128 SCLK with a period of 1/128 of the sampling clock, and FIG. 12C shows an audio signal. The references A0 to A3 on FIG. 12C each indicate one sample of a respective one of the four audio sectors A0 to A3 of FIGS. 4A and 7C which were explained in connection with the previous embodiment, that is, the digital audio signals of the four channels.

One sample of the audio signal of each audio sector A0 to A3 has 32-bit data. FIGS. 13A, 13B and 13C are diagrams illustrating an expansion of the time base of FIGS. 12A, 12B and 12C, respectively. FIG. 13C indicates one sample of a digital audio signal within one of the audio sectors A0 to A3. The symbol SY represents a sync mark for synchronization with other devices. MU is a mute flag which is brought to "1", for example, at the error concealment circuits 30B and 30C, respectively, by the flag control signal from the track jump detector 62. CR is a cross fading flag and is also brought to "1", for example, by the flag control signal from the track jump detector 62, at the error concealment circuits 30B and 30C, respectively. CO is a concealment flag and is brought to "1", for example, by the outer code encoders 28A, 28B and 28C when concealment is necessary at the error concealment circuits 30A, 30B and 30C. B0 to B3 are preemphasis, U1 to U4 are user bits, and D0 to D19 are audio data.

A sector ID signal will now be described with reference to FIG. 14.

As explained with respect FIG. 5, the ID signal has a two-byte length. One of the two bytes is allocated to a sync block number, while the remaining byte is the sector ID shown in FIG. 14. The first bit, that is a V/A bit of the sector ID, indicates whether the respective block is a video sync block or an audio sync block. The track number T0 or T1 of the two tracks to be recorded is written into the second bit, that is a T bit. The third and fourth bits, that is, S0 and S1 bits, indicate the segment number, and the fifth, sixth and seventh bits, that is F0, F1 and F2 bits, indicate the field number.

The track jump detector 62 detects whether the above-mentioned sector ID signal, that is, the ID signal of the digital audio signal of the first copy coincides with the ID signal of the digital audio signal of the second copy. As earlier noted, the track jump detector 62 also detects whether the ID signal of the digital audio signal of the first copy has continuity in respect to the ID signal of the digital audio signal of the first or second copy reproduced immediately before the digital audio signal of the first copy. Using flag control signals which depend on the detection result, each flag (mute flag MU or cross fading flag CR) of the digital audio signal of the first and second copies of the error concealment circuits 30B and 30C is brought to "1", for example.

The detection state of the track jump detector 62 and the processing which depends upon the detection state will now be described. First, if both of the signals of the first and second copies are reproduced and the ID signals of the audio signals of the first and second copies coincide and the ID signal of the audio signal of the first copy has continuity in respect to the ID signal of the audio signal of the first or second copy reproduced immediately before the audio signal of the first copy, it is assumed that no track jump of the dynamic tracking head has taken place. A control signal is supplied to the selector 52, and the digital audio signal of the second copy from the error concealment circuit 30A is supplied to the analog/digital interface 31.

Further, if both of the ID signals of the audio signals of the first and second copies are reproduced and the ID signals of the audio signals of the first and second copies coincide, but the ID signal of the audio signal of the first copy does not have continuity in respect to the ID signal of the audio signal of the first or second copy reproduced immediately before the audio signal of the first copy, it is assumed that a track jump has taken place. In response to the foregoing conditions, a flag control signal is sent to the error concealment circuit 30C, so that the mute flag MU of the second audio signal is brought to "1".

If the ID signals of the audio signals of the first and second copies do not coincide and the ID signal of the digital audio signal of the first copy has continuity in respect to the ID signal of the digital audio signal of the first or second copy reproduced immediately before the audio signal of the first copy, it is assumed that a track jump has taken place. In such case, a flag control signal is fed to the error concealment circuit 30C, and the cross fading flag CR is brought to "1".

Further, if the ID signals of the audio signals of the first and second copies do not coincide and the ID signal of the digital audio signal of the first copy has continuity in respect to the ID signal of the digital audio signal of the first or second copy reproduced immediately before the audio signal of the first copy, it is assumed that a track jump has occurred. In response to the foregoing conditions, a flag control signal is supplied to the error concealment circuit 30C, and the mute flag MU of the audio signal of the second copy is brought to "1".

Next, when only one of the ID signals of the digital audio signals of the first and second copies is obtained and this ID signal has continuity in respect to the ID signal of the digital audio signal of the first or second copy reproduced immediately before the reproduction of the digital audio signal from which the ID signal is provided as mentioned above, it is assumed that no track jump occurs. In such case, a selection signal is supplied to the selector 52, and the audio signal of the second copy from the concealment circuit 30A is supplied to the analog/digital interface 31.

Further, in the case where only one of the ID signals of the digital audio signals of the first and second copies is obtained and this ID signal does not have continuity in respect to the ID signal of the digital audio signal of the first or second copy reproduced immediately before the reproduction of the digital audio signal it is assumed that a track jump has taken place. A flag control signal is consequently supplied to the error concealment circuits 30B and 30C, and the mute flag MU of the audio signal of the reproduced first or second copy is brought to "1".

Next, when neither of the ID signals of the digital audio signals of the first and second copies is provided, a flag control signal is supplied to the error concealment circuit 30C so that the mute flag MU and the cross fading flag CR of the audio signal of the second copy are brought to "1", respectively.

The mute flag MU or the cross fading flag CR of the audio signal of the first or second copy fed to the audio I/0 circuit 63 is detected. For example, when the mute flag MU is "1" and the cross fading flag CR is "0", one sample of the digital audio signal shown in FIG. 13C is muted. When the mute flag MU is "0" and the cross fading flag CR is "1", in order to carry out crossfading coefficients which gradually decrease are multiplied by the digital audio signal of the first copy, and coefficients which gradually increase are multiplied by the audio signal of the second copy.

Further, when both the mute flag MU and the cross fading flag CR are "1", the audio signals A0 to A3 of one segment, as described with respect to FIG. 12, are muted. When both the mute flag MU and the cross fading flag CR are "0", the digital audio signal is not supplied to the bus BUS.

What is claimed is:

1. In a digital information signal reproducing apparatus having a rotary head means for reproducing digital signals from sequentially arranged tracks on a recording medium, said digital information signal reproducing apparatus having a first, normal speed reproduction mode in which said recording medium is driven at a normal speed for reproducing a first pair of digital audio signals each of which has the same contents and is recorded on a respective one of two oblique tracks which are close to each other on said recording medium and a second, variable speed reproduction mode in which the recording medium is run at a speed different from said normal speed, the combination comprising:

head position control means for controlling a scanning position of said rotary head means so that the latter scans said tracks during said second, variable speed reproduction mode for causing said rotary head means to periodically jump over a plurality of the tracks such that a second pair of digital audio signals each including different data are consequently reproduced in place of said first pair of digital audio signals;

detecting means for detecting when said rotary head means, as controlled by said head position control means, jumps over a plurality of said tracks; and processing means responsive to said detecting means for switching the reproduced ones of said second pair of digital audio signals for a predetermined period at the time of said jump.

2. A digital information signal reproducing apparatus according to claim 1, wherein said head position control means includes movable support means for said rotary head means, and means for providing a variable driving signal for said movable support means; and wherein said detecting means includes level detecting means for detecting a level change of said driving signal for said head position control means, and control signal generating means for generating a control signal for said processing means based on an output of said level detecting means.

3. In a digital information signal reproducing apparatus having a rotary head means for reproducing digital signals from sequentially arranged tracks on a recording medium, said digital information signal reproducing apparatus having a first, normal speed reproduction mode in which said recording medium is driven at a normal speed for reproducing a first pair of digital audio signals each of which has the same contents and is recorded on a respective one of two oblique tracks which are close to each other on said recording medium, and a second, variable speed reproduction mode in which the recording medium is run at a speed different from said normal speed, the combination comprising:

head position control means for controlling a scanning position of said rotary head means so that the latter scans said tracks during said second, variable speed reproduction mode for causing said rotary head means to periodically jump over a plurality of tracks such that a second pair of digital audio signals each including different data are consequently reproduced in place of said first pair of digital audio signals;

identification signal detecting means for detecting identification signals of data blocks of the reproduced digital audio signals track jump detecting means for sensing said jump of said rotary head means on the basis of said identification signals detected by said identification signal detecting means; and processing means responsive to said track jump detecting means for switching the reproduced ones of said second pair of digital audio signals for a predetermined period at the time of said jump.

4. A digital information signal reproducing apparatus according to claim 4, wherein said processing means is operative to selectively effect said switching in accordance with a plurality of switching modes in response to said track jump detecting means.

5. In a digital information signal reproducing apparatus having a rotary head means for reproducing digital signals from sequentially arranged tracks on a recording medium, said digital information signal reproducing apparatus having a first, normal speed reproduction mode in which said recording medium is driven at a normal speed for reproducing a first pair of digital audio signals each of which has the same contents and is recorded on a respective one of two oblique tracks which are close to each other on said recording medium, and a second, variable speed reproduction mode in which the recording medium is run at a speed different from said normal speed, the combination comprising:

head position control means including movable support means for said rotary head means and further including means for providing a variable driving signal for said movable support means so as to control a scanning position of said rotary head means so that the latter scans said tracks during said second, variable speed reproduction mode while causing said rotary head means to periodically jump over a plurality of the tracks such that a second pair of digital audio signals each including different data are consequently reproduced in place of said first pair of digital audio signals;

detecting means including level detecting means for detecting a level change of said driving signal for said movable support means so as to detect when said rotary head means, as controlled by said head position control means, jumps over a plurality of said tracks and further including control signal generating means for generating and supplying therefrom a control signal based on an output of said level detecting means; and processing means responsive to said control signal from said control signal generating means of said detecting means for cross fading the reproduced ones of said second pair of digital audio signals for a predetermined period at the time of said jump.

6. In a digital information signal reproducing apparatus having a rotary head means for reproducing digital signals from sequentially arranged tracks on a recording medium, said digital information signal reproducing apparatus having a first, normal speed reproduction mode in which said recording medium is driven at a normal speed for reproducing a first pair of digital audio signals each of which has the same contents and is recorded on a respective one of two oblique tracks which are close to each other on said recording medium and a second, variable speed reproduction mode in which the recording medium is run at a speed different from said normal speed, the combination comprising:

head position control means for controlling a scanning position of said rotary head means so that the latter scans said tracks during said second, variable speed reproduction mode for causing said rotary head means to periodically jump over a plurality of the tracks such that a second pair of digital audio signals each including different data are consequently reproduced in place of said first pair of digital audio signals;

detecting means including identification signal detecting means for detecting identification signals of data blocks of the reproduced digital audio signals, and further including track jump detecting means for sensing when said rotary head means, as controlled by said head position control means, jumps over a plurality of said tracks on the basis of said identification signals detected by said identification signal detecting means; and processing means for selectively switching the reproduced ones of said second pair of digital audio signals for a predetermined period at the time of said jump in accordance with a plurality of switching modes in response to an output from said track jump detecting means, said processing means having means for cross fading the reproduced ones of said second pair of digital audio signals in one of said switching modes, and for muting at least one of said second pair of digital audio signals in another of said switching modes.

* * * * *